US005639292A

United States Patent [19]
Hawkins

[11] Patent Number: 5,639,292
[45] Date of Patent: Jun. 17, 1997

[54] PROCESS AND APPARATUS FOR APPLYING SIZE TO GLASS FIBERS

[75] Inventor: Christopher M. Hawkins, Alexandria, Ohio

[73] Assignee: Owens-Corning Fiberglas Technology Inc., Summit, Ill.

[21] Appl. No.: 366,525

[22] Filed: Dec. 30, 1994

[51] Int. Cl.$^6$ .............................. C03C 25/02; C03B 37/02
[52] U.S. Cl. .................. 65/443; 65/453; 65/475; 65/529; 65/533; 427/337; 427/355; 427/398.2
[58] Field of Search ............................... 65/443, 447, 450, 65/453, 475, 479, 529, 530, 533, 539; 427/331, 337, 355, 374.1, 374.2, 389.7, 398.1, 398.2

[56] References Cited

U.S. PATENT DOCUMENTS

| | | |
|---|---|---|
| 2,272,588 | 2/1942 | Simison ............................ 65/443 X |
| 2,723,215 | 11/1955 | Biefeld et al. ..................... 65/443 X |
| 3,473,950 | 10/1969 | Wong . |
| 3,772,870 | 11/1973 | Wong et al. . |
| 3,920,313 | 11/1975 | Wong et al. . |
| 4,013,435 | 3/1977 | Kane et al. . |
| 4,042,360 | 8/1977 | Kane et al. . |
| 4,440,557 | 4/1984 | Morrison et al. ................... 65/530 X |
| 4,473,618 | 9/1984 | Adzima et al. . |
| 4,767,556 | 8/1988 | Childers et al. . |
| 4,790,906 | 12/1988 | Coffey et al. . |
| 4,855,341 | 8/1989 | Paul et al. . |
| 5,055,119 | 10/1991 | Flautt et al. ....................... 65/529 X |
| 5,443,611 | 8/1995 | Salvador et al. ................... 65/529 X |

FOREIGN PATENT DOCUMENTS 482085   3/1938   United Kingdom .................... 65/443

*Primary Examiner*—James Engel
*Assistant Examiner*—M. Curtis Mayes
*Attorney, Agent, or Firm*—C. Michael Gegenheimer; Inger H. Eckert

[57] ABSTRACT

A process and apparatus are provided for coating a sizing composition onto glass fibers. The apparatus includes an applicator for applying a liquid sizing composition to the glass fibers and a treatment station for treating the sized fibers to increase the viscosity of the sizing composition, thereby improving the adherence of the sizing composition to the fibers.

13 Claims, 4 Drawing Sheets

PROCESS AND APPARATUS FOR APPLYING SIZE TO GLASS FIBERS

BACKGROUND OF THE INVENTION

This invention is directed to a process and apparatus for applying size to glass fibers and, more particularly, to a process for modifying the viscosity of the size once it has been applied to glass fibers and apparatus for carrying out that process.

Glass fibers are useful in a variety of technologies. For example, glass fibers are commonly used as reinforcements in polymer matrices to form glass fiber reinforced plastics or composites.

As is known in the art, glass fibers which are intended for use as reinforcements usually require a size. The size, also commonly referred to as "sizing composition," serves to provide a lubricating quality to the individual fibers to provide them with abrasion resistance.

Glass fibers are susceptible to breakage if scratched or otherwise damaged. Scratches and surface defects sometimes occur as the fibers come into contact with one another during fiber production. The breakage of a single fiber during the manufacture of a plurality of glass fibers (e.g., 5000 fibers) interrupts fiber production. In order to reduce breakage and other related problems, size is applied to the fibers during fiber production. That is, the glass fibers are sized with a protective material substantially immediately after they are formed.

In the process of producing glass fibers, size is applied as the fibers are mechanically drawn from a molten glass source, such as a bushing. If a glass fiber package is being formed, the sized glass fibers are gathered into a strand and wound onto a collet. During winding, a significant amount of sizing composition is lost as a result of centrifugal forces occurring during the winding process. The portion of the size lost during winding is referred to as "slingoff." The loss of materials resulting during winding is dependent upon, among other things, the speed of the winding process. At typical winding speeds, a conventional glass fiber manufacturing line will lose approximately 45 percent of the chemicals applied to the fibers. This represents a significant amount of waste that results in higher production costs.

One attempt made in the past to reduce the amount of slingoff involves increasing the viscosity of the sizing composition before it is applied to the glass fibers. However, the thickened sizing composition results in an increase in fiber breakage at the applicator roller. The thickened sizing composition also makes it difficult to apply a uniform coating of sizing composition to the fibers.

Accordingly, a need still exists for an improved size coating process which reduces size slingoff.

SUMMARY OF THE INVENTION

The present invention meets that need by providing a process and apparatus for coating a sizing composition onto glass fibers so that slingoff is reduced. The improved process involves treating the sized fibers to increase the viscosity of the sizing composition on the fibers such that the adherence of the sizing composition to the fibers is improved.

In accordance with a first aspect of the present invention, an in-line process is provided for coating a sizing composition onto glass fibers. The process comprises the steps of applying a liquid sizing composition to glass fibers, and treating the sized fibers to increase the viscosity of the sizing composition, thereby improving the adherence of the sizing composition to the fibers. The process may be used during the manufacture of a single-end product or a split product.

In one embodiment, the viscosity of the sizing composition is increased by applying a modifying composition to the sized fibers which effects a change in the pH of the liquid sizing composition. Preferably, the modifying composition is an organic acid. Most preferably, it is selected from the group consisting of acetic acid and citric acid.

In another embodiment, the viscosity of the sizing composition is increased by lowering the temperature of the sized fibers. Preferably, the temperature of the sized fibers is lowered to a temperature of from about −100° C. to about 0° C.

In accordance with a second aspect of the present invention, a process is provided for producing a plurality of sized glass fibers. The process comprises the steps of drawing a plurality of glass fibers from a source of molten glass, applying a sizing composition to the fibers, and treating the sized fibers to increase the viscosity of the sizing composition, thereby improving the adherence of the sizing composition to the fibers.

In accordance with a third aspect of the present invention, an apparatus is provided for coating a sizing composition onto glass fibers drawn from a source of molten glass. The apparatus comprises an applicator for applying a sizing composition to the fibers, and a treatment station for treating the sized fibers to increase the viscosity of the sizing composition, thereby improving the adherence of the sizing composition to the fibers.

In one embodiment, the treatment station comprises a second applicator for applying a modifying composition to the sized fibers which effects a change in the pH of the liquid sizing composition.

In another embodiment, the treatment station comprises a cooling device for lowering the temperature of the sized fibers.

In accordance with a fourth aspect of the present invention, an apparatus is provided for producing a glass fiber package. It comprises a heated bushing for supplying streams of molten glass to be drawn into continuous fibers, a rotatable member adapted to draw the streams into fibers and to wind the fibers into a package, an applicator for applying a sizing composition to the fibers, and a treatment station for treating the sized fibers to increase the viscosity of the sizing composition, thereby improving the adherence of the sizing composition to the fibers.

Accordingly, it is an object of the present invention to provide an improved size coating process which reduces size slingoff. It is a further object of the present invention to provide an improved apparatus for coating a sizing composition onto glass fibers. These and other objects and advantages of the present invention will be apparent from the following description and the appended claims.

DETAILED DESCRIPTION OF THE PREFERRED EMBODIMENTS

Figure 1:
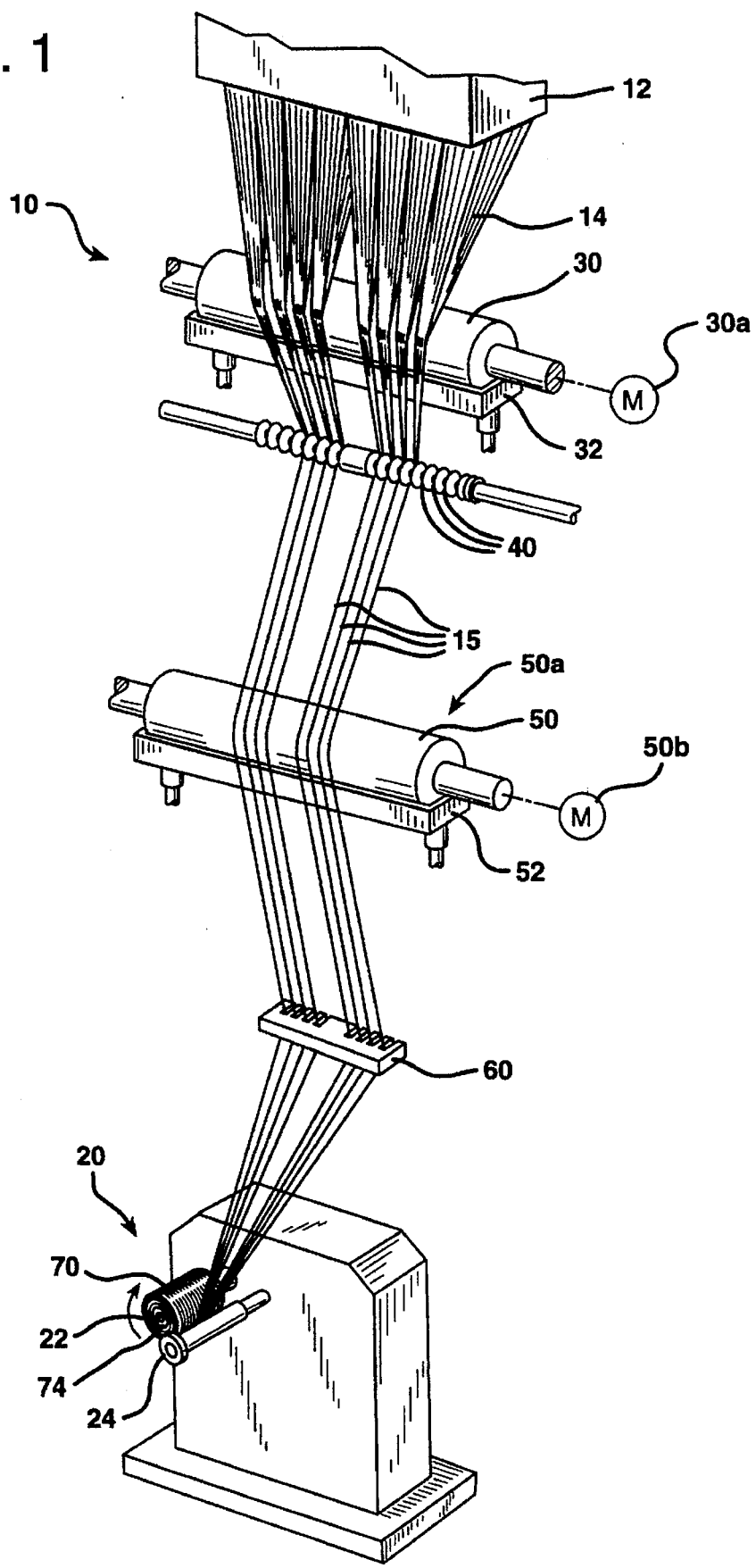
FIG. 1 illustrates an apparatus formed in accordance with a first embodiment of the present invention which includes a second applicator roller.

An apparatus for producing a glass fiber package in accordance with the present invention is shown in FIG. 1, and is generally designated by the reference numeral 10. The apparatus 10 comprises a bushing 12 having a number of orifices (not shown) through which a plurality of streams of molten glass are discharged. The orifices may be extended by hollow studs or tips (not shown). In the illustrated embodiment, the streams of glass are mechanically drawn to form continuous fibers 14 via a winder device 20.

The fibers 14 pass over an applicator roller 30 which applies a liquid coating of sizing composition (also referred to herein as size) to the fibers 14. Sizing compositions are typically aqueous based, but may be of any other suitable type. A trough 32 containing the sizing composition is positioned below the roller 30. The roller 30 extends into the trough 32 and, as it is rotated by a conventional drive device 30a, transfers sizing composition from the trough 32 to the fibers 14. Other devices or techniques for applying size to the glass fibers 14 may be used in place of the applicator roller 30.

In the illustrated embodiment, the sized fibers 14 are split into discrete bundles 15 via primary or first shoes 40. The shoes 40 are formed from a ceramic material.

From the shoes 40, the discrete bundles 15 move to a size modification treatment station 50a which serves to increase the viscosity of the size on the bundle fibers to improve the adherence of the sizing composition to the fibers. A second applicator roller 50 is provided at the treatment station 50a. The bundles 15 pass over and contact the second applicator roller 50 and receive a coating of a liquid that increases the viscosity of the sizing composition on the bundle fibers. A trough 52 containing the viscosity-increasing liquid is positioned below the roller 50. The roller 50 extends into the trough 52 and, as it is rotated by a conventional drive device 50b, transfers viscosity-increasing liquid from the trough 52 to the bundle fibers.

The sizing composition comprises an emulsion of water and a variety of compounds including: lubricants; film formers; coupling agents, such as silanes; surfactants; and, emulsifiers. Example lubricants include tristearates, trioleates, polyvinyl pyrrolidone and mixtures thereof. Example film formers include polyurethanes such as Reichhold 97903 (which is commercially available from Reichhold Chemicals, Inc.) and water soluble polymers such as the polypropylene-maleic anhydride compositions "Chemcor 43N40" (which is commercially available from the Chemical Corporation of America) and "Icopol OC" (which is commercially available from National Starch).

The viscosity-increasing liquid comprises any liquid which will effect a change in the pH of the liquid sizing composition resulting in increased viscosity. Altering the pH of a sizing composition is believed to produce a break-up of the size emulsion. Separating the solids from the water in such a manner is believed to result in an increase in the viscosity of the size. Either a basic composition or an acidic composition may be used, depending on the type of size being applied. Basic liquids have been effective in thickening acidic sizes such as those containing cationic film formers. Acidic liquids, on the other hand, are useful for thickening basic sizes such as those containing anionic film formers. Examples of anionic film formers are the polypropylene-maleic anhydride compositions discussed above. Preferably, the acidic viscosity-increasing liquids are organic acids. Most preferably, organic acids such as citric acid and acetic acid are used.

After passing over the second applicator roller 50, the fiber bundles 15 pass through a separating shoe 60. The spacing between the bundles 15 is maintained by the shoe 60 until the bundles 15 are gathered together at the winding device 20. The bundles 15 are wound via the winder device 20 onto a sleeve or tube 74 to form a glass fiber package 70. The winder device 20 comprises a rotatable member or a collet 22, upon which is provided the removable tube 74. The winder device 20 also includes a conventional traversing mechanism 24 to distribute the tow 16 along the length of the tube 74.

Figure 2:
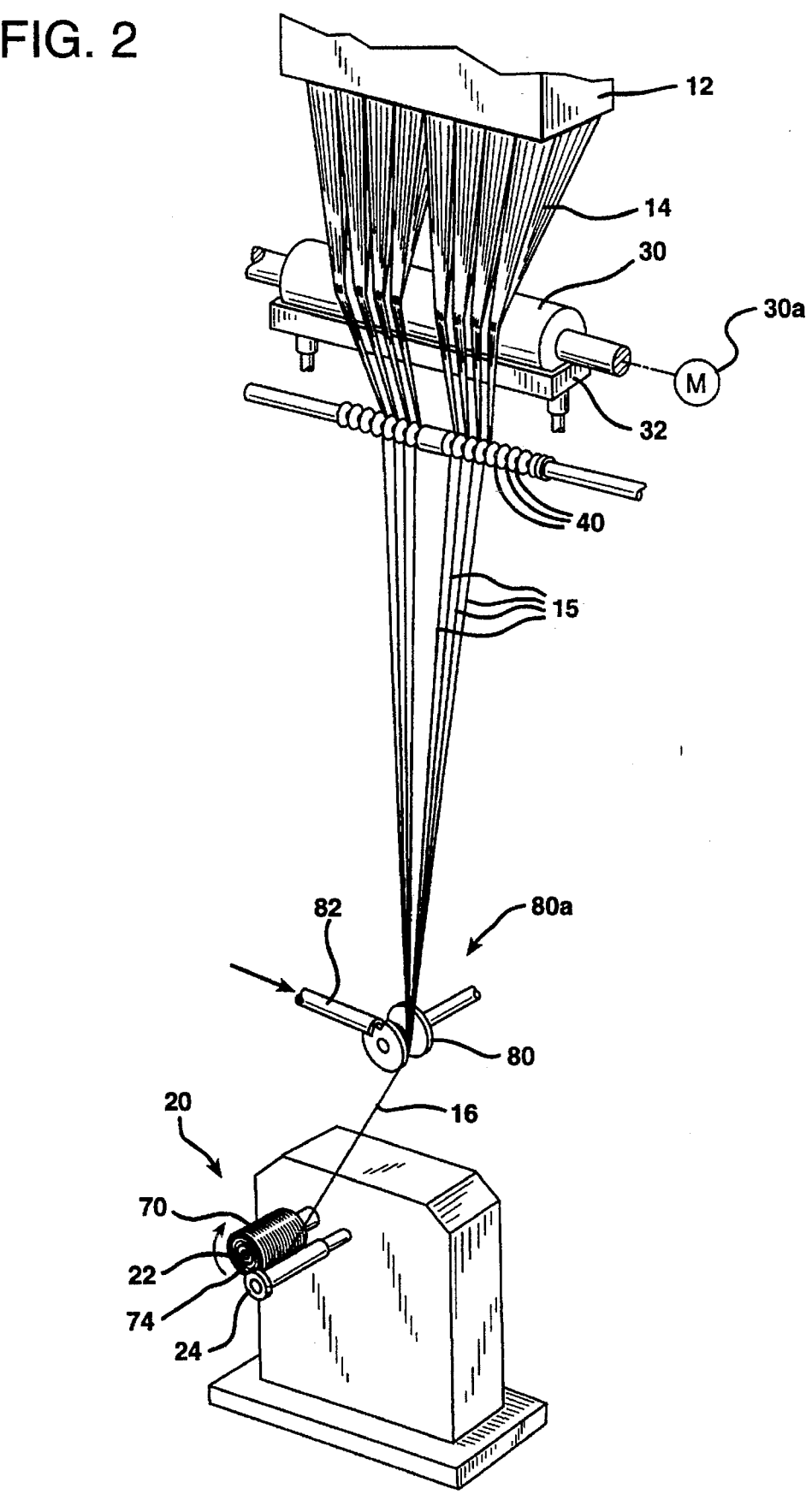
FIG. 2 illustrates an apparatus formed in accordance with a second embodiment of the present invention which includes a modified gathering shoe.
Figure 2A:
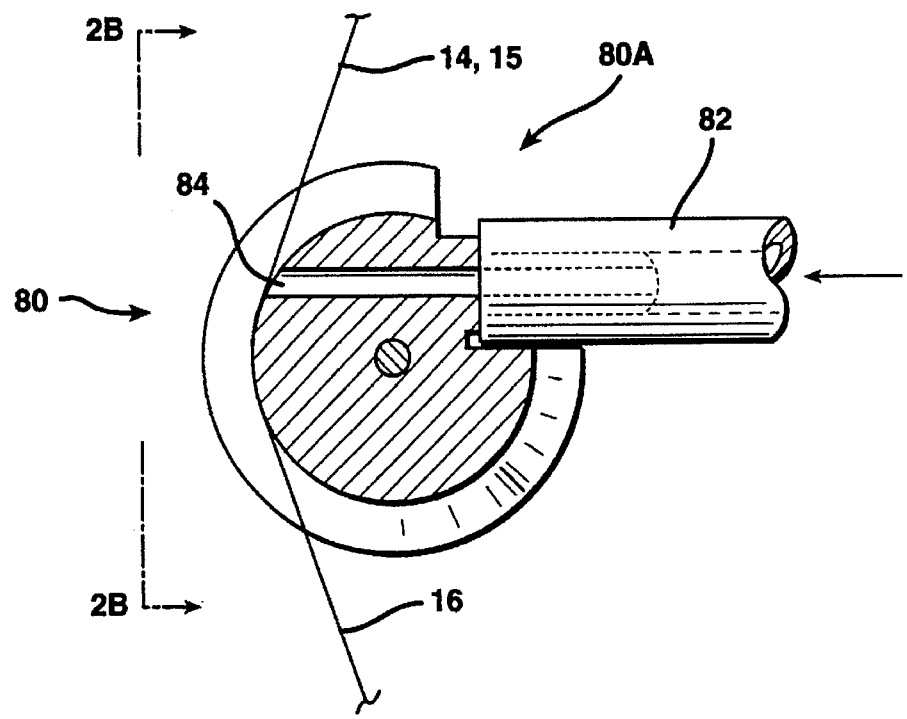
FIG. 2A is a view, partially in section, of the modified gathering shoe of FIG. 2.
Figure 2B:
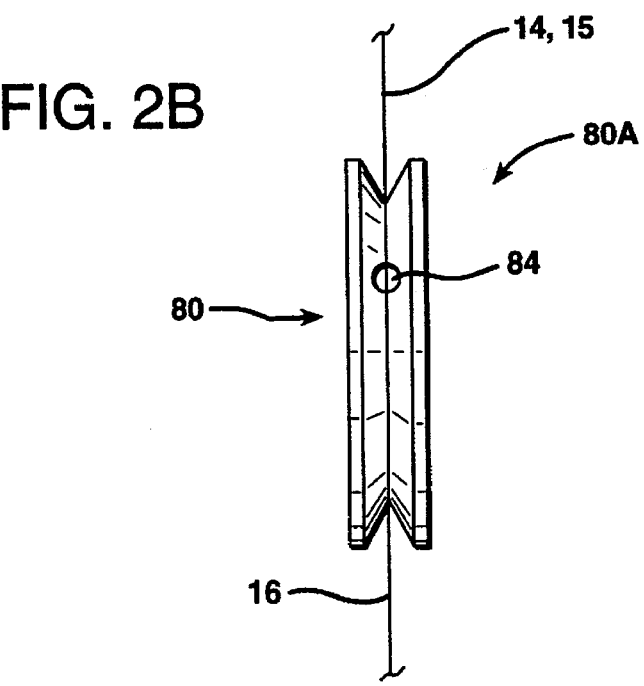
FIG. 2B is a view taken along view line 2B—2B in FIG. 2A.

In an alternative embodiment shown in FIG. 2, where like reference numerals indicate like elements, a size modification treatment station 80a comprising a modified gathering shoe 80 is used in place of the size modification treatment station 50a and the separating shoe 60 shown in FIG. 1. In this embodiment, the fiber bundles 15 are gathered together via the modified gathering shoe 80 to form a single tow 16. The modified gathering shoe 80 contains a liquid dispensing tube 82 which applies a viscosity-increasing liquid to the fibers 14 via a dispensing hole 84, see FIGS. 2A and 2B. As noted previously, the viscosity-increasing liquid comprises any liquid which will effect a change in the pH of the liquid sizing composition resulting in increased viscosity. From the modified gathering shoe 80, the tow 16 is wound via the winding device 20.

Figure 3:
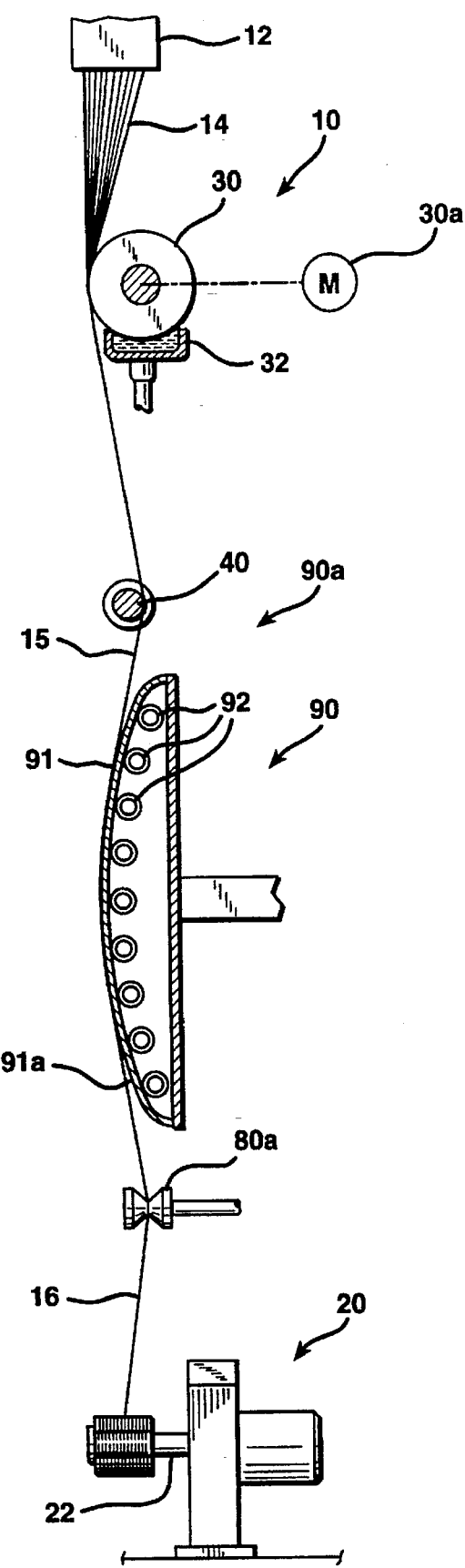
FIG. 3 illustrates an apparatus formed in accordance with a third embodiment of the present invention which includes a cooling device.

In a second alternative embodiment shown in FIG. 3, where like reference numerals indicate like elements, a size modification treatment station 90a comprising a cooling device 90 is used to lower the temperature of the sizing composition on the fibers of the fiber bundles 15 to increase the viscosity of the sizing composition. From the shoes 40, the fiber bundles 15 pass over and contact the cooling device 90. The cooling device 90 comprises a contact plate 91 having a curved outer surface 91a which is directly contacted by the fiber bundles 15. Cooling coils 92, through which a coolant such as freon is circulated, are spaced a small distance from the plate 91 and serve to cool the plate 91. As the fiber bundles 15 pass over the plate 91, energy in the form of heat is transferred from the fiber bundles 15 to the plate 91. The resultant temperature decrease of the sizing composition on the glass fibers produces an increase in the viscosity of the sizing composition. The fiber bundles 15 then engage a standard gathering shoe 80a where they come together to form a tow 16. The tow 16 is wound via the winding device 20.

It is also contemplated that the size modification treatment station of the present invention may comprise one or more sprayer devices for applying the viscosity-increasing liquid to the sized fibers to increase the viscosity of the sizing composition and, hence, improve the adherence of the sizing composition to the fibers.

It is further contemplated that additional products may be produced using an apparatus having any one of the size modification treatment stations set out herein. For example, a single-end product, such as a Type-30® product (i.e., a square-edge shippable forming product) may be formed using an apparatus including one of the treatment stations disclosed herein. Other products that may be formed using an apparatus having one of the size modification treatment stations of the present invention include: panel roving; yarn; glass fiber products for use in bulk molding compound products, sheet molding compound products, and glass fiber reinforced thermoplastic products; and other like products.

The following examples are given to illustrate certain details of the invention, it being understood that the details of the examples are not to be taken as in any way limiting the invention thereto.

EXAMPLE 1

A sizing composition containing 1 weight percent of a silane, which is commercially available from the Union Carbide Corporation under the product name "A1100," and 10 weight percent of a film former consisting of a polypropylene-maleic anhydride composition which is commercially available from the Chemical Corporation of America under the product name "Chemcor 43N40", was applied to K filament glass fibers. The K filament glass fibers were formed by drawing the fibers through a 2000 hole bushing at a glass throughput rate of 80 pounds per hour. The fibers were then formed into a single tow. The resultant strand solids (weight of chemicals÷(weight of glass+weight of chemicals)) was 0.45%.

The same sizing composition was applied to another batch of K filament glass fibers drawn through the same 2000 hole bushing at the same throughput rate. After the application of the size to these glass fibers, acetic acid was sprayed onto the sized fibers. The resultant strand solids was 0.72%. This represents a 60% increase in application efficiency over that achieved in the previous run where a viscosity-increasing liquid was not used.

EXAMPLE 2

A series of tests were conducted to determine the effect of acetic acid application on sized glass fibers produced at various roll speeds and prepads (water applied to the glass strands prior to size application). Glass fibers were sized with a sizing composition containing 1.18 weight percent A1100 silane, 1.44 weight percent ammonium hydroxide, 2.72 weight percent terephthalic acid, 7.46 weight percent Chemcor 43N40, and 1.73 weight percent Reichhold 97903. The application method shown in FIG. 2 was used to apply the size to the fibers. The effect of acetic acid was tested by using one of three methods. The sized strands were either wound with no further treatment (listed in Table 1 as "Acetic Acid Percentage 0.00"), treated with a liquid containing 10% acetic acid and 90% water (listed in Table 1 as "Acetic Acid Percentage 10.00"), or treated with 100% acetic acid (listed in Table 1 as "Acetic Acid Percentage 100.00"). The results are presented in Table 1.

The data clearly demonstrates that the acetic acid application increases loss on ignition (the amount of organic material adhered to the glass fibers) and application efficiency.

TABLE 1

| Run | Roll Speed ft/min | Prepads gal/hr | Acetic Acid Percentage | Application Efficiency[1] | LOI[2] |
|---|---|---|---|---|---|
| A | 22.00 | 2.50 | 0.00 | 69.50 | 0.88 |
| B | 22.00 | 2.50 | 10.00 | 81.70 | 0.95 |
| C | 22.00 | 2.50 | 100.00 | 82.70 | 1.07 |
| D | 25.00 | 2.50 | 0.00 | 70.70 | 1.06 |
| E | 25.00 | 2.50 | 100.00 | 79.10 | 1.15 |
| F | 22.00 | 5.00 | 0.00 | 73.60 | 0.88 |
| G | 22.00 | 5.00 | 10.00 | 79.60 | 0.89 |
| H | 22.00 | 5.00 | 100.00 | 85.30 | 0.97 |

[1] Amount of solids adhered to the fibers ÷ Amount of solids consumed in the process.
[2] Loss on ignition.

EXAMPLE 3

The sized glass fibers produced in Example 2 were used to produce glass fiber reinforced polypropylene products. The sized fibers produced in Example 2 were used in the following runs:

A: Runs 1 and 9       D: Runs 4 and 12      G: Runs 7 and 15
B: Runs 2 and 10      E: Runs 5 and 13      H: Runs 8 and 16
C: Runs 3 and 11      F: Runs 6 and 14

The glass fiber reinforced polypropylene products were produced using chopped glass fibers in a standard melt extrusion process. Runs 1–8 produced a product containing about 30% glass and about 70% uncoupled polypropylene (Profax 6523). Runs 9–16 produced a product containing about 30% glass and about 70% chemically coupled polypropylene. The results are presented in Tables 2 and 3.

The data demonstrates that acetic acid application generally increases flex toughness in uncoupled polypropylene.

TABLE 2

Uncoupled polypropylene
30% Glass, 70% Profax 6523[1]

| Run | Tensile Stress $10^3$ psi | Flex Stress $10^3$ psi | Flex Toughness ft-lbs/in$^3$ | IZOD Unnotched ft-lbs | IZOD Notched ft-lbs | Glass % |
|---|---|---|---|---|---|---|
| 1 | 10.06 | 16.29 | 34.48 | 6.56 | 2.14 | 29.75 |
| 2 | 9.72 | 15.88 | 48.36 | 6.28 | 2.07 | 29.05 |
| 3 | 9.41 | 14.99 | 62.41 | 5.34 | 1.97 | 29.91 |
| 4 | 9.75 | 15.71 | 53.22 | 6.54 | 2.17 | 29.75 |
| 5 | 9.26 | 15.14 | 42.25 | 5.30 | 1.99 | 30.06 |
| 6 | 9.49 | 15.53 | 39.06 | 6.48 | 2.08 | 30.15 |
| 7 | 9.18 | 15.12 | 58.03 | 5.86 | 1.98 | 29.75 |
| 8 | 8.79 | 14.08 | 46.90 | 5.63 | 1.85 | 29.95 |

[1] Uncoupled polypropylene available from Himont Industries

TABLE 3

Chemically coupled polypropylene
30% glass, 65% Profax 6523, 5% Polybond 3001[1]

| Run | Tensile Stress $10^3$ psi | Flex Stress $10^3$ psi | Flex Toughness ft-lbs/in$^3$ | IZOD Unnotched ft-lbs | IZOD Notched ft-lbs | Glass % |
|---|---|---|---|---|---|---|
| 9 | 11.00 | 18.56 | 78.61 | 11.15 | 2.57 | 29.37 |
| 10 | 10.58 | 18.12 | 62.22 | 10.20 | 2.37 | 29.31 |
| 11 | 11.15 | 17.81 | 72.62 | 10.42 | 2.34 | 29.13 |
| 12 | 11.24 | 18.48 | 64.22 | 11.07 | 2.53 | 29.52 |
| 13 | 11.11 | 18.21 | 67.14 | 9.42 | 2.32 | 29.83 |
| 14 | 11.18 | 17.98 | 58.90 | 11.78 | 2.46 | 29.47 |
| 15 | 11.20 | 18.08 | 66.53 | 10.44 | 2.48 | 29.85 |
| 16 | 10.84 | 17.87 | 49.46 | 9.95 | 2.29 | 29.56 |

[1] A maleic anhydride modified polypropylene available Uniroyal Chemical Company Having described the invention in detail and by reference to preferred embodiments thereof, it will be apparent that modifications and variations are possible without departing from the scope of the invention defined in the appended claims.

I claim:

1. A process for coating a sizing composition onto glass fibers comprising the steps of:
   applying a sizing composition to glass fibers; and
   lowering the temperature of said sizing composition to increase the viscosity of said sizing composition by drawing said fibers into contact with a contact plate, thereby improving adherence of said sizing composition to said fibers.

2. A process according to claim 1 wherein the temperature of the sizing composition is lowered to a temperature of from about −100° C. to about 0° C.

3. A process for coating a sizing composition onto glass fibers comprising the steps of:

applying a sizing composition to glass fibers to form sized fibers; and treating said sized fibers to increase the viscosity of said sizing composition, thereby improving adherence of said sizing composition to said fibers, by drawing said sized fibers into contact with a cooling device and lowering the temperature of said sizing composition to a temperature of from about −100° C. to about 0° C.

4. A process for coating a sizing composition onto glass fibers comprising the steps of:

applying a sizing composition to glass fibers; and treating said sized fibers to increase the viscosity of said sizing composition, thereby improving the adherence of said sizing composition to said fibers, by applying a modifying composition to said sized fibers which effects a change in the pH of said sizing composition.

5. The process of claim 4, wherein said modifying composition is an organic acid.

6. The process of claim 5, wherein said organic acid is selected from the group consisting of acetic acid and citric acid.

7. A process for producing a plurality of sized glass fibers comprising the steps of:

drawing a plurality of glass fibers from a source of molten glass;

applying a sizing composition to said fibers, and treating said sized fibers to increase the viscosity of said sizing composition, thereby improving the adherence of said sizing composition to said fibers, by applying a modifying composition to said sized fibers which effects a change in the pH of said liquid sizing composition.

8. The process of claim 7, wherein said modifying composition is an organic acid.

9. The process of claim 8, wherein said organic acid is selected from the group consisting of acetic acid and citric acid.

10. An apparatus for coating a sizing composition onto glass fibers from a source of molten glass comprising:

an applicator for applying a sizing composition to said fibers; and a contact plate for lowering the temperature of said sizing composition to increase the viscosity of said sizing composition, thereby improving adherence of said sizing composition to said fibers.

11. An apparatus according to claim 10 wherein said contact plate lowers the temperature of said sizing composition to a temperature of about −100° C. to about 0° C.

12. An apparatus for coating a sizing composition onto glass fibers drawn form a source of molten glass comprising:

an applicator for applying a sizing composition to said fibers to form sized fibers;

a first shoe for separating the sized fibers into bundles to form bundled sized fibers;

a treatment station for treating said bundled sized fibers to increase the viscosity of said sizing composition, thereby improving the adherence of said sizing composition to said fibers to form treated sized fibers; said treatment station comprising a second applicator for applying a modifying composition to said sized fibers which effects a change in the pH of said sizing composition; and a second shoe for maintaining the treated sized fibers in bundles.

13. An apparatus for producing a glass fiber package comprising:

a heated bushing for supplying streams of molten glass to be drawn into continuous fibers;

a rotatable member adapted to draw said streams into said fibers and to wind said fibers into a package;

a first shoe for separating said fibers into bundled fibers;

an applicator for applying a sizing composition to said bundled fibers to form sized fibers;

a treatment station for treating said sized fibers to increase the viscosity of said sizing composition, thereby improving the adherence of said sizing composition to said fibers; said treatment station comprising a second applicator for applying a modifying composition to said sized fibers which effects a change in the pH of said sizing composition; and a second shoe for maintaining said sized fibers in bundles.

\* \* \* \* \*